May 21, 1929.  L. SAIVES  1,713,980
SEAT OF MOTOR CARS
Filed Feb. 4, 1928  2 Sheets-Sheet 1
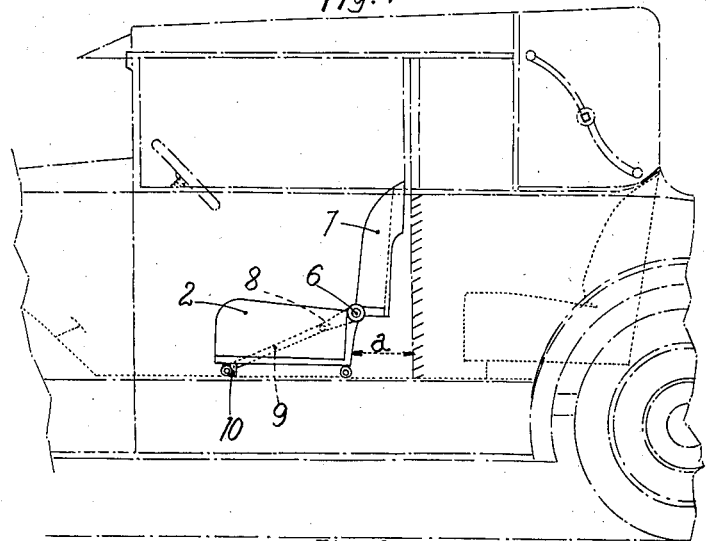
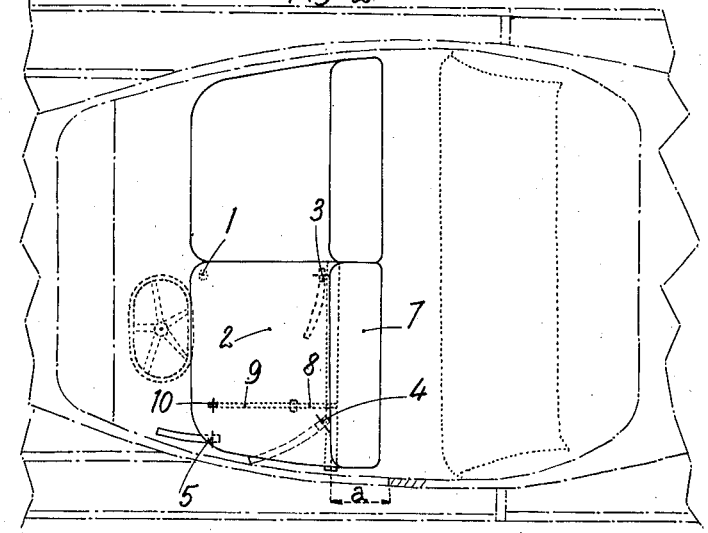
INVENTOR
LÉON SAIVES,
By
ATTORNEYS.

May 21, 1929.    L. SAIVES    1,713,980
SEAT OF MOTOR CARS
Filed Feb. 4, 1928    2 Sheets-Sheet 2
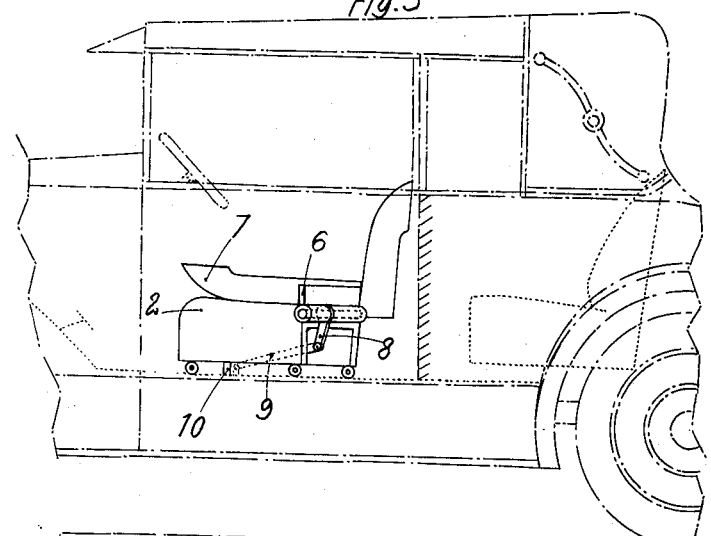
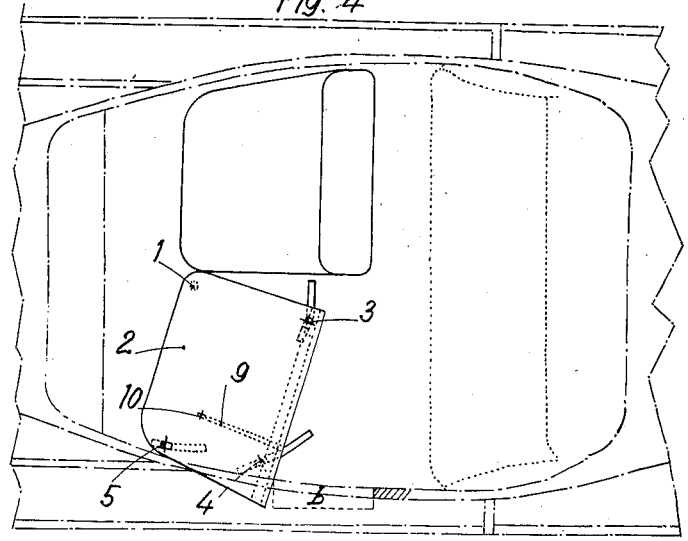
INVENTOR
LÉON SAIVES.
By
O'Neill & Bunn
ATTORNEYS.

Patented May 21, 1929.

1,713,980

UNITED STATES PATENT OFFICE.

LÉON SAIVES, OF BILLANCOURT, FRANCE, ASSIGNOR TO LOUIS RENAULT, OF BILLANCOURT, FRANCE.

SEAT OF MOTOR CARS.

Application filed February 4, 1928, Serial No. 251,983, and in France July 9, 1927.

The search for comfort in the equipment of the coach bodies of self-propelled vehicles has led to the study of more and more roomy seats; but the increase of the depth of the seats, especially those in front, is not without presenting certain inconveniences. One of the chief of these is the encroachment of the front seats on the passage, which should be left to the back seats. Access to these latter becomes extremely difficult, and it has been necessary to find means of doing away more or less completely with the front seat in order to increase the passage between the seat and the door jamb.

The solutions proposed generally have the defect of requiring multiple and complicated maneuvers and mechanisms. Their construction is costly and their use inconvenient.

According to the invention there is provided a movable front seat with hinged back comprising a simple mechanism, which by the easy operation of merely turning down the back on to the seat automatically effects the displacement of the whole seat and the setting free of the passage to the back seat.

To obtain this result a connecting rod is fixed to the rotating part of the hinge, which allows the back to be turned down, said rod taking part in the rotation of the hinge, and the end thereof moving from the front towards the back. This connecting rod operates connecting rods hooked to a fixed point on the floor, located towards the front. When the back is turned down, the pull exerted on this fixed point is converted into a displacement of the seat itself. This displacement, may be a shifting of the seat forwards parallel to itself, or preferably a pivoting on the floor, if any one of the feet of the seat be fixed. In this latter case, the fixed point will be chosen, as well as the ratios of the lever arms, in such way that the pivoting takes place at a sufficiently large angle to set free to the greatest possible extent the passage between the front seat and the door jamb.

The accompanying drawing shows, by way of example, one construction according to the invention, in which the seat pivots about a fixed point by the operation of turning down the back.

Figure 1 is an elevation of a motor car provided with a movable front seat according to the invention.

Figure 2 is a corresponding plan view.

Figure 3 is an elevation in which the movable front seat has been shifted in such manner as to allow of easy access to the back seats.

Figure 4 is a corresponding plan view.

As may be seen in Figure 1, the door opening intended to give access to the back seats only allows a very restricted space, indicated by $a$, between the rear of the back of the front seat and the edge of the jamb. So as not to have to give an excessive width to the door, the solution has been adopted of introducing a movable front seat, which allows of enlarging the passage momentarily.

The seat properly so-called is mounted on four feet, one of which 1 is fixed to the floor, whilst allowing the seat as a whole to pivot about it, the other three, 3, 4 and 5 are fitted with castors capable of displacement in guides or tracks fixed on the floor.

At the rear of the seat 2, there is arranged across its whole width, a shaft 6, on which the back 7 is jointed. A lever-arm 8, rotating together with the back 7, is jointed on the shaft 6 and has attached to it a rod 9 connected at 10 to a fixed point on the floor. The requisite articulations are provided at the meeting points of the several members.

It is seen that if the back 7 be turned down on to the seat 2 by rotating about the shaft 6, the lever 8, which is in one with it, will be displaced backwards, but as it carries with it the rod 9 attached at 10 to the floor of the motor car, this backward displacement of the lever 8 has the effect of making the whole seat 2 pivot about the foot 1, the feet 3, 4 and 5 rolling on their guides. The seat 2 is thus displaced forwards through a certain angle, which increases the passage $a$ existing between the back of the seat 2 and the door jamb; this passage becoming momentarily equal to $b$ and renders the back seats more accessible. When the passengers have taken their places on the back seats it suffices to lift up the back 7 to bring the seat 2 into its normal position by a reverse movement.

It is to be clearly understood that the aforesaid details of construction are given only by way of example and that they may be modified as needed. The system is applicable as stated at the beginning for obtaining both a translatory as well as a pivoting movement. The latter will however be preferable in the majority of cases, since it allows of giving greater amplitude to the displacement of that part of the seat, which is nearest to the door jamb, and consequently most in the way of access to the back seats. Furthermore this amplitude will be regulated in each case by suitably determining the point, at which it is most advantageous to attach the rod upon which the lever attached to the turn-down back exerts its pull.

Claims:

1. A vehicle seat having one of its legs rotatively secured to the floor of the vehicle, a back pivotally connected to the seat, and cooperating means secured to the floor and back whereby a downward movement of the back towards the seat will cause a forward rotatative movement of the latter around said leg as its axis, substantially as and for the purposes set forth.

2. A vehicle seat having one of its legs rotatively secured to the floor of the vehicle, a back pivotally connected to the seat, and cooperating means secured to the floor and back whereby a downward movement of the back towards the seat will cause a forward rotative movement of the latter around said leg as its axis, said means being also operative to restore the seat to normal position upon a reverse movement of the back.

3. A vehicle seat having one of its legs rotatively secured to the vehicle floor, a back foldable towards said seat, a shaft pivotally connecting the back to said seat, a lever rigidly secured to said shaft, and a rod pivoted at one end to the floor and at the other end to said lever, whereby a downward pull of the back towards said seat will be transmitted to the point of connection of said rod to the floor, and cause a forward rotative movement of the seat around said leg as its axis.

4. A vehicle seat having one of its legs rotatively secured to the vehicle floor, a back foldable towards said seat, a shaft pivotally connecting the back to said seat, a lever rigidly secured to said shaft, and a rod pivoted at one end to the floor and at the other end to said lever, whereby a downward pull of the back towards said seat will be transmitted to the point of connection of said rod to the floor, and cause a forward rotative movement of the seat around said leg as its axis, and a reverse movement of said back will operate to restore said seat to its normal position In testimony whereof I affix my signature.

LÉON SAIVES.